United States Patent [19]

Öhlin

[11] Patent Number: 4,732,408
[45] Date of Patent: Mar. 22, 1988

[54] MEANS FOR A SHOCK-ABSORBER

[76] Inventor: Kenth Öhlin, P.O. Box 722, S-194 27 Upplands Väsby, Sweden

[21] Appl. No.: 821,730
[22] PCT Filed: Mar. 14, 1985
[86] PCT No.: PCT/SE85/00120
§ 371 Date: Dec. 4, 1985
§ 102(e) Date: Dec. 4, 1985
[87] PCT Pub. No.: WO85/04698
PCT Pub. Date: Oct. 24, 1985

[30] Foreign Application Priority Data

Apr. 4, 1984 [SE] Sweden ............................... 8401874

[51] Int. Cl.4 .............................................. F16F 9/34
[52] U.S. Cl. .................................... 280/707; 188/299; 188/319; 188/322.15; 280/714
[58] Field of Search ............... 188/283, 299, 300, 319, 188/320, 321.11, 322.15; 267/123; 280/707, 714

[56] References Cited

U.S. PATENT DOCUMENTS 2,748,898  6/1956  de Carbon ................. 188/322.15 X

FOREIGN PATENT DOCUMENTS 1242350  8/1960  France ................................ 188/320
57-173632 10/1982  Japan ............................. 188/322.15
 379971 10/1975  Sweden .
1450765  9/1976  United Kingdom .
1485003  9/1977  United Kingdom .
2112104  7/1983  United Kingdom .
2120355 11/1983  United Kingdom .

OTHER PUBLICATIONS

English translation of a portion of published Japanese patent application 57-173,629(A) of M. Kashima, entitled *Hydraulic Buffer* (Oct. 26, 1982).

Primary Examiner—George E. A. Halvosa
Attorney, Agent, or Firm—Pollock, Vande Sande & Priddy

[57] ABSTRACT

A shock-absorber is designed to be used in particular with a motor cycle or a motor car. The shock-absorber is so arranged as to permit the variation of the shock-absorbing capacity or the resistance of the shock-absorber by use of control impulses from an external computerized unit. The shock-absorber is of the kind which comprises cylinder operating with a fluid or with fluid gas. Inside the cylinder is a fixed piston which is provided with at least one passageway. In this passageway fluid is able to flow from one side of the piston to its other side, and vice versa. The piston has built into it a member capable of being controlled by the control unit and so arranged as to vary depending on the control impulses received from the control unit and so arranged as to vary depending on the control impulses received from the control unit the cross-sectional area of the passageway, causing a variation in the shock-absorbing capacity.

8 Claims, 4 Drawing Figures

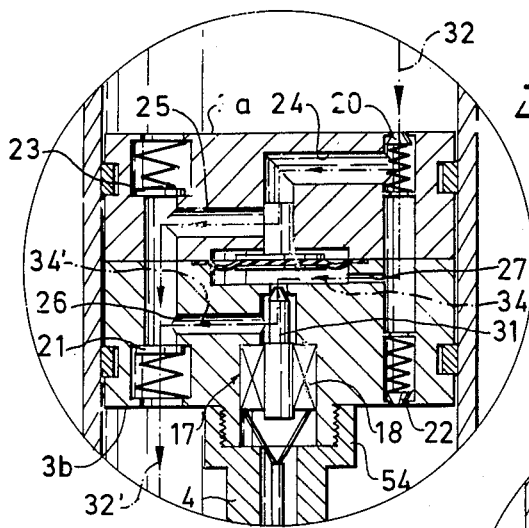
Fig. 1a
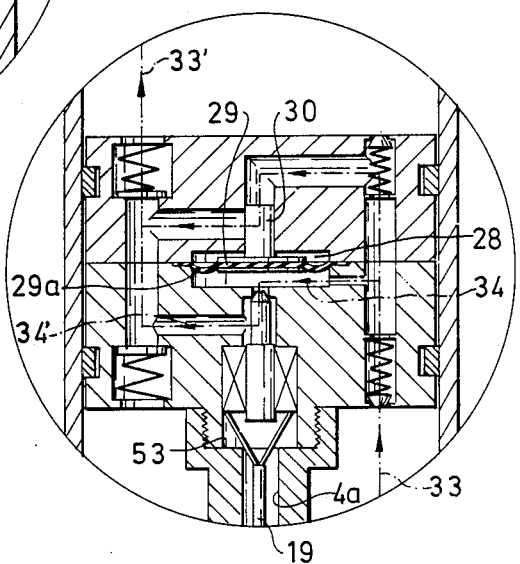
Fig. 1b
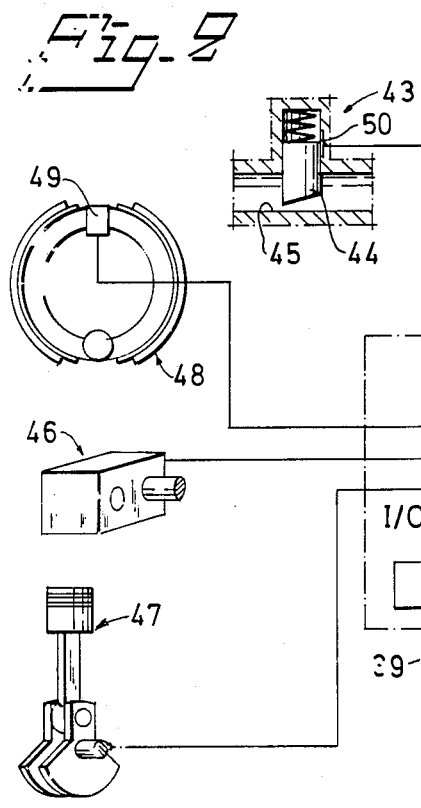
Fig. 2
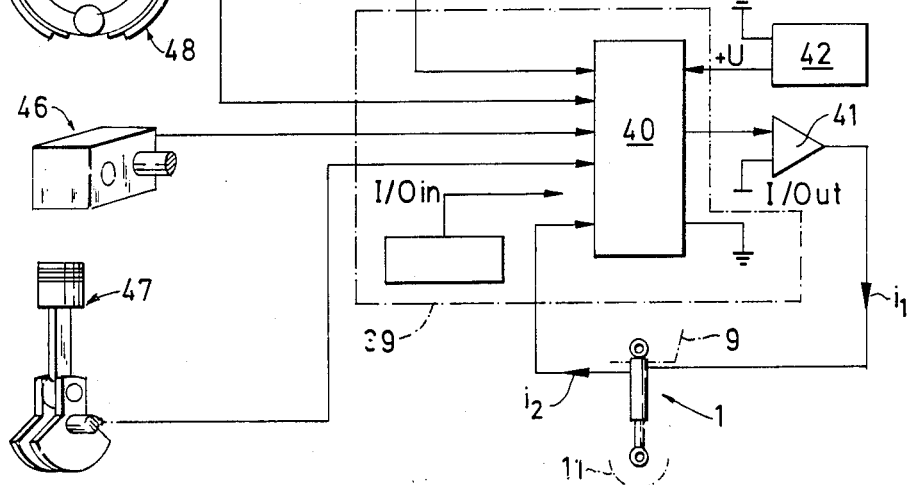

4,732,408

MEANS FOR A SHOCK-ABSORBER

TECHNICAL FIELD

The present invention relates to a means intended for a shock-absorber in order to permit variation of the shock-absorbing capacity of the shock-absorber by means of control impulses from an external control unit, for example in the form of or incorporating a computer. The shock-absorber in this case is of the kind which comprises a cylinder operating with fluid or fluid/gas. Arranged inside the cylinder is a piston provided with at least one passageway via which fluid is transferred from one side of the piston to its other side, and vice versa.

DESCRIPTION OF THE PRIOR ART

Shock absorbers are used in a variety of applications where there is a requirement to absorb forces from a moving mass. By way of example, mention may be made of shock-absorbers for motor vehicles, for example motor cycles and motor cars, where the shock-absorber is fitted between a wheel and the chassis for the purpose of contributing to the optimum jolt-free movement of the chassis, in spite of any irregularities in the surface over which the vehicle is being driven. Another example is provided by the case in which rotating masses which are also subject to centrifugal forces must be provided with shock-absorption in relation to a solid surface.

Shock-absorbers provided with constant resistance of shock-absorbing capacity are previously known in the art. Known is a shock-absorber with replaceable or additional component parts to provide the optimum result with regard to the shock-absorbing capacity on each occasion on which the vehicle is driven.

Also known in the art is the provision of a variation in shock-absorbing capacity with the assistance of an external control unit which may take the form of or may incorporate a computer unit or calculator, etc. The control unit can be supplied with information relating to the behaviour of the vehicle, which in turn is controlled by the actions of the driver. Thus, for example, the control unit may be supplied with information in respect of the speed of the vehicle, the torque being transmitted by the engine, and any changes in speed and inclination, etc. With the help of this information, the control unit is able to calculate the optimum shock-absorbing function for the shock-absorber at any given time and to control the shock-absorber in such a way that it will provide the shock-absorption determined by calculation.

SUMMARY OF THE INVENTION

In systems with an external control unit it is desirable to be able to achieve a technically simple construction for the shock-absorber in which the variation function of the shock-absorber is integrated with the construction of the shock-absorber as a whole. In the case of motor cycles, for instance, it is desirable to be able to avoid external components which must form part of, or must be connected to, the shock-absorber. Thus, the aim is to achieve a construction for the shock-absorber which requires no external additions or other design changes because of the requirement for it to be provided with the aforementioned variation facility for its shock-absorbing capacity.

SOLUTION

It is an object of the present invention to provide a means which will solve this problem amongst others. The new features of the present invention include provisions of a piston means capable of being controlled from the control unit and so arranged as to vary depending on the control impulses received from the control unit, the cross-sectional area of the passageway referred to by way of, introduction, in so doing causing a variation to occur in the shock-absorbing capacity.

Further developments of the idea of invention are based on, the construction of the controllable means. Accordingly, this is intended in a preferred embodiment to be included in or to form an electrically controlled servo valve. This valve receives an electrical control signal from the external control unit and initiates a force-exerting flow of fluid dependent upon the control signal, this fluid flow acting upon a means to determine the size of the cross-sectional area of the passageway.

These further developments are also based on the manner in which a check valve arrangement must be executed in order to comply with the fundamental concept described above. Accordingly, each direction of flow through the piston must be provided with its own pair of check valves. Furthermore, in each of the directions of flow, fluid can be conducted via two parallel channels. A valve in the control means determines the flow of a control fluid in the first channel for the purpose of determining the position of a membrane which is utilized there. The membrane is in turn connected to a valve which determines the flow of a master fluid in the other channel.

The control means is activated from the external control unit through electrical connecting means which in this case may incorporate one or more electrical conductors which extend between the piston and the outside of the shock-absorber. The shock-absorber is provided with a sensor which transmit the necessary parameter information to the control unit. This parameter information may consist of information relating to position, movement and/or the direction of movement of the piston.

Preferably the control unit consists of a computer unit. In the event of the shock-absorber being fitted to a motor vehicle, the computer unit is supplied with information relating to the gas supply, the vehicle gearbox and/or the vehicle, brakes, etc.

ADVANTAGES

According to the present invention the shock-absorber retains its neat construction and comparatively small external volume, despite the introduction of the facility to vary the shock-absorbing capacity. Furthermore, it is possible to achieve a reliable variation function with comparatively little power consumption, which is of great importance for motor vehicles.

DESCRIPTION OF THE DRAWINGS

A preferred embodiment of a means exhibiting the significant characteristic features of the invention is described below with simultaneous reference to the accompanying drawings, in which:

FIG. 1a shows a sectional view on an enlarged scale of the construction of a piston in the shock-absorber in accordance with FIG. 1 and a first fluid flow from the first side of the piston to its second side;

FIG. 1b shows the construction of the piston of FIG. 1, but with a second fluid flow from the second side to the first side of the piston; and FIG. 2 shows in the form of a basic diagram the construction of the electronic component for the shock-absorber in accordance with FIG. 1.

BEST MODE OF CARRYING OUT THE INVENTION

Figure 1:
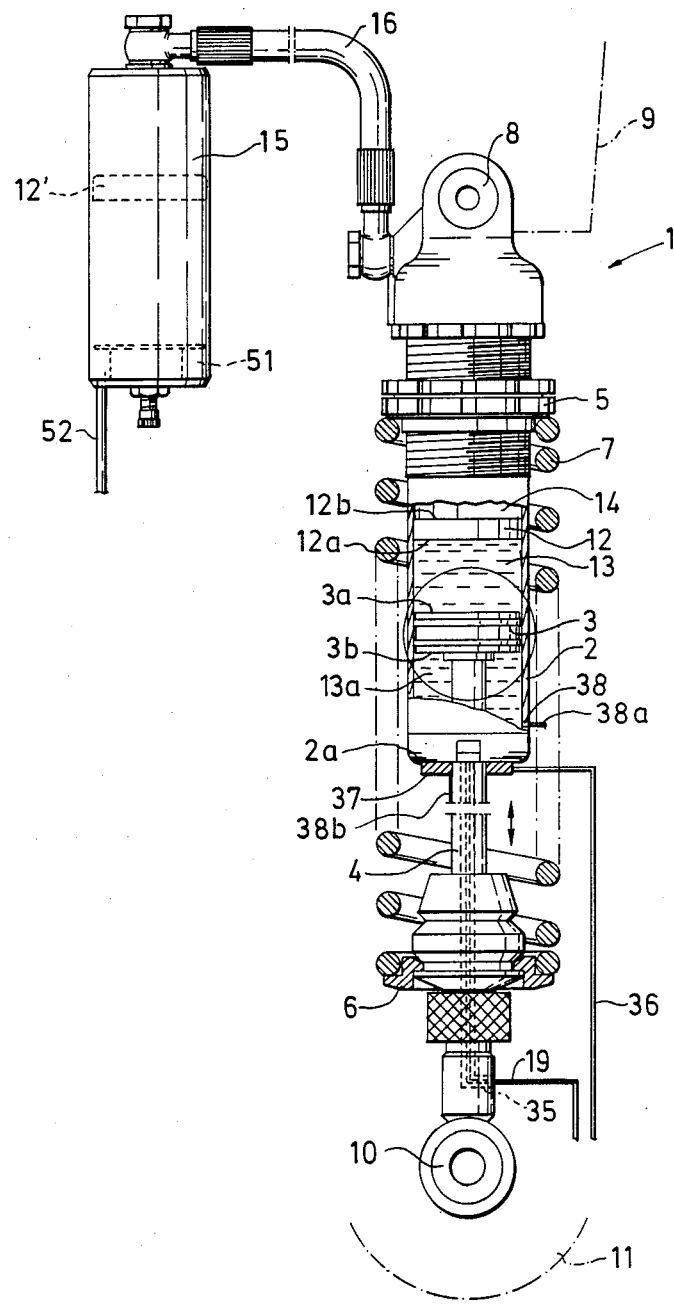
FIG. 1 shows a side view of a shock-absorber which operates with fluid/gas.

In FIG. 1 a shock-absorber is indicated by the reference numeral 1. The basic construction of the shock-absorber may be of a type known in the art. An example of such a shock-absorber is the Ohlins 'Gas Shocks' shock-absorber sold on the open market. A shock-absorber of this kind may incorporate a cylinder 2 and arranged inside it a piston 3 with its associated piston rod 4. Both the cylinder 2 and the piston rod 4 are provided with seatings 5 and 6 for a coil spring 7. The cylinder is provided with attachment members 8 for securing it to a chassis, indicated here by reference numeral 9. The piston rod is provided at its free end with a corresponding attachment 10 for securing it to, for example a wheel 11. The seating 6 follows the movement of the piston rod.

In addition to the fixed piston 3 the shock-absorber of FIG. 1 is provided with a moving piston 12, which has one of its sides 12a facing towards a fluid 13 present inside the cylinder and its other side 12b facing towards a gas 14 present inside the cylinder. The gas side of the operating cylinder is connected to an accumulator 15 via a connection 16.

Since the basic function of the shock-absorber is already very familiar, it is not described in any greater detail here. Fixed piston 3 in accordance with FIG. 1 is provided with transcurrent passageways which make it possible for a fluid on one side 3a of the piston to pass through the piston to its other side 3b, and vice versa. The shock-absorption effect provided by the shock-absorber occurs, amongst other things, because of the presence of the fluid passageway which acts as a constriction between the sides 3a and 3b of the piston.

In accordance with the present invention, the fluid passageway must be variable. For this purpose a control means is arranged to vary, depending on control impulses received from an external control unit (not shown) in FIG. 1, the cross-sectional area of the passageway between said sides 3a and 3b of the piston. The control means in the present embodiment shown here can be activated by means of electrical signals from the control unit. The control means also operates with a servo function so that small control signals will cause and actuate the variation in the passageway. In the present embodiment the control means includes a control valve 17, preferably in the form of a conventional solenoid valve. The winding 18 in this solenoid valve is connected to the control unit by wires 19, being two in number in the embodiment shown.

Each direction of flow from one side to the other of the piston 3 is provided with its own pair of check valves. Thus the direction of flow from 3a to side 3b is provided with the check valves 20 and 21. The other direction of flow is provided with a pair of check valves 22, 23. Two parallel flow channels 24, 25 and 26, 27 are arranged in these pairs of check valves. In addition the piston is provided with an internal space 28, inside which is arranged a membrane 29. To the membrane there is preferably securely attached a valve 30. Valve 30 is arranged in the flow channel 24, 25 which forms part of the main passgeway between sides 3a and 3b of the piston. A needle 31 in the solenoid valve is arranged in the flow channel 26, 27 which forms a control passageway for the servo function of the controllable organ.

If, for example, the fluid pressure on side 3a exceeds the fluid pressure on side 3b of the piston, fluid will flow from the check valve 20 through passageways 24, 25 and 26, 27 as far as and then out through check valve 21 depending upon the manner in which needle 31 is regulated. A fluid flow corresponding to the setting of the needle will be formed in the channel 26, 27.

A force corresponding to the flow will act upon the membrane 29, which in turn will regulate the valve 30 in the channel 24, 25. If the needle 31 is actuated by the winding 18 to completely close the passageway 26, 27, no control flow will occur and the valve 30 will keep the channel 24, 25 completely closed. A small effect upon the needle will give rise to a small control flow, which in turn will produce a correspondingly small downward effect on the membrane as shown in the Figure, allowing valve 30 to open in channel 24, 25. A maximum effect on the needle 31 will produce a maximum control flow and a correspondingly maximum effect on the membrane and the valve 30, which will permit maximum flow in the main channel 24, 25, and so on.

In the case of positive pressure being exerted on the side 3b of the piston in relation to the side 3a, the pair of check valves 22, 23 will enter into effect instead. Their function will be equivalent to that described above, but with the difference that the direction of flow in the main channel 24, 25 will be the opposite. The direction of flow from side 3a to side 3b is indicated by the arrows 32 and 32' in FIG. 1a, whereas the opposite direction of flow is indicated by the arrows 33, 33' in FIG. 1b. The direction of flow in the control channel is indicated by the arrows 34, 34' for both the flows referred to above in accordance with FIGS. 1a and 1b.

Membrane 29 is flexibly supported inside the space 28 by moving attachments 29a. These attachments may consist of suspension spring mountings of a previously disclosed kind, for example of a plastics material which is sufficiently strong to withstand the fluid contemplated, which may for example be hydraulic oil. The spring mounting of membrane 29 provides sealing between the lower and upper surfaces of the membrane so that the negative pressure produced by the control pressure is able to act upon the membrane in accordance with the present invention.

The pairs of check valves 20, 21 and 22, 23 may be in the form of check valves of a previously known kind. The passageways or channels can be provided by bores in the piston material. These bores being made in a previously known fashion.

The wire or wires 19 is/are routed inside a central channel 4a in the piston rod 4. It is also possible to install the conductor or conductors on the outside of the piston rod 4. In FIG. 1 the outlet for the conductors 19 is represented by a side channel 35. The conductors are suspended in order to provide sufficient free play to permit maximum relative movement to take place between the piston rod and the cylinder. This suspension of the conductors may be accomplished in a previously known fashion without wear being caused to the conductors.

In accordance with the present invention, the shock-absorber will transmit a signal back to the external control unit. This signal will preferably inform the external control unit of the position of the shock-absorber in relation to the positions of the piston and the operating cylinder. This information is utilized by the external control unit to determine the speed of the movements between the chassis 9 and the unit 11, and the length of the suspension travel remaining until the respective end positions are reached, etc. The return signal may be transmitted via additional conductors 36 which may be one, two or more in number. In the embodiment shown, means 37 is arranged on the end surface 2a of the cylinder 21. Means 37 may be of a previously known kind which provides information on the speed of the relative movements of the piston and the cylinder. The cylinder may also be fitted with end position sensors 38 connected via conductors 38a to the external control unit. Only one end position sensor is shown in the Figure in the interests of clarity.

The external unit 11 may be a microcomputer of a previously disclosed kind. The microcomputer is shown in FIG. 2 and may be installed in a suitable location on the vehicle. An example of the type of computer which may be used is the microcomputer sold on the open market by Motorola under the reference 6805. The microcomputer is identified in FIG. 2 by the reference numeral 39 and comprises a CPU 40 with its associated memories, for example ROM and RAM memories arranged in the same chip. The program which controls the shock-absorber is entered into the ROM memory. This memory can also contain stored constants holding the information required by the program for the control functions contemplated. Furthermore, the RAM memory may be used for random storage of calculation variables. The electronic equipment also includes a current amplifier 41 of a previously known kind. This amplifier is of the STD type and provides the control means 17, 18 with control signals. The current amplifier is an adapter circuit for matching the power requirement of the shock-absorber to the power output of the microcomputer. The power supply to the microcomputer is provided from the electrical generating means 42 of the vehicle. The microcomputer is connected to one or more means which provide information about the behavior of the vehicle, as determined by the driver. One example of an means which provides information is a gas supply system 43 which, by valve 44, controls the supply of fuel in a fuel line 45. Another example is provided by those parts of the vehicle which provide information about its speed; this may be the gearbox 46 of the vehicle, in which case information can be obtained both from the position of the gear lever 47 and from rotating units inside the gearbox. A third information-providing means which may be of interest in this context is one or more of the brakes 48 of the vehicle. Each of means 43, 46 and 48 is fitted with one or more sensors 49, 50 to provide the required information.

In the Figure the control signal from the microcomputer 40 to the shock-absorber is indicated by $i_1$; the return signal from the shock-absorber to the microcomputer is indicated by $i_2$.

With the help of the sensor, information is supplied to the microcomputer. On the basis of this information the computer is then able to determine by, for example, the speed of the vehicle, the torque being transmitted by the engine, and any change in speed (acceleration or retardation), the behaviour of the vehicle caused by the influence of the driver. With these quantities or parameters the microcomputer is able by activating the control means to adjust the resistance or the shock-absorbing capacity of the shock-absorber to achieve optimum function at any given moment. The speed at which information is transmitted between the microcomputer and the shock-absorber can be high, and may, for example, reach 100,000 pieces of information per second. The execution and number of the sensors used in various applications may vary within wide limits. The objective, however, is to provide the microcomputer at all times with sufficient information on driver's actions or intentions in order to utilize optimum vehicle performance.

Due to the present invention it is possible to link the resistance of the shock-absorber to this driver/vehicle performance. The resistance of the shock-absorber need not be limited to a number of different factors specified at the time of manufacture, but may now be optimized on a continuous basis. This means that considerable improvements can be achieved in road-holding in many different respects, for example one or more, or all of the following functions: better braking ability, better acceleration and/or better cornering ability, etc.

The sensor may incorporate code discs 38b on the outside of the piston rod 4. The positions of these code discs can be scanned by means of means 37, for example with the help of photo-transistors.

As an alternative to, or in addition to the sensors 37, 38, the sensing of the position and/or the speed of the pistion in relation to the cylinder 2 can be performed by monitoring the pressure by use of a pressure-monitoring means 51 connected to the external control unit by conductors 52, which may for example be two in number. The pressure-monitoring means 51 can be of a previously known kind. The variations in pressure due to the relative movements between the piston and the cylinder 2 are monitored at very closely-spaced intervals by the microcomputer, which calculates the speeds/positions of the piston relative to the cylinder.

The piston 12 is positioned inside the cylinder 2 if the accumulator 15 is not present. If the accumulator 15 is present, then this will instead constitute the moving piston 12′, in which case the piston 12 in the cylinder may be omitted. The pressure means 51 is positioned inside the cylinder 2 if the accumulator is not present.

The solenoid valve 17 is positioned in a recess 53 (FIG. 1b) which is covered by a combined covering and retaining means 54 (FIG. 1a). The piston also exhibits a parting plane, and the parts of the piston are held together in a previously known, but not illustrated, fashion, for example by means of bolts.

The control means has a protected position inside the piston. It is not exposed to the main fluid between the upper and under sides of the piston. The control means is able to control the control passage essentially independent of the pressure difference between the upper and under surfaces of piston, at least in the normal operating conditions.

The invention is not restricted to the embodiment shown above by way of example, but may undergo modifications within the context of the following Patent Claims and the idea of invention.

I claim:

1. A device for controlling the shock-absorbing capacity of the shock-absorber by means of control signals from an external control unit, said shock-absorber being of the type including a cylinder operating with a fluid and a piston arranged in the cylinder, said piston being provided with at least one passageway through which fluid is capable of being transferred from one side to the other side of said piston and vice versa comprising: a controllable means capable of being controlled by control signals from said control unit and in response to said signals varying the cross-sectional area of said passagewy thereby causing a variation in the shock-absorbing capacity, wherein each of the directions of the fluid flow is capable of being conducted through two parallel channels and wherein said control means includes a valve for determining the flow of a control fluid in the first channel for determining the position of a membrane, and another valve connected to the membrane for determining the flow of a master fluid in the other channel.

2. A device according to claim 1 wherein said controllable means constitutes an electrically actuated servo valve, and said control signals from said control unit actuates a force-exerting flow of fluid acting upon said controllable means for determining the size of the cross-sectional area of the passageway.

3. A device according to claim 2 wherein a pair of check valves is provided for every direction of the fluid flow through the piston.

4. A device according to claim 3 wherein said control unit is a computer, and said controllable member is connected to said controlling unit through an electrical connecting means.

5. A device according to claim 4 further comprising a pressure sensing means arranged for sensing any pressure changes in the fluid caused by relative movements between the piston and the cylinder.

6. A device according to claim 2 wherein said sensing means is monitored by said control unit at closely spaced intervals.

7. A device according to claim 1 wherein said control unit is a computer unit and said shock-absorber is fitted to a motor vehicle, said computer unit receiving information signals from means capable of influencing the behavior of the vehicle such as gas supply, vehicle gear box and vehicle brakes.

8. A device according to claim 7 wherein monitoring occurs preferably 100,000 times per second.

* * * * *